United States Patent
Hirata

(10) Patent No.: US 9,735,436 B2
(45) Date of Patent: Aug. 15, 2017

(54) SEPARATOR FOR FUEL CELL

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 103 days.

(21) Appl. No.: 14/748,729

(22) Filed: Jun. 24, 2015

(65) Prior Publication Data
US 2016/0006044 A1 Jan. 7, 2016

(30) Foreign Application Priority Data

Jul. 1, 2014 (JP) .................................. 2014-135980

(51) Int. Cl.
| | |
|---|---|
| *H01M 8/026* | (2016.01) |
| *H01M 8/0206* | (2016.01) |
| *H01M 8/0254* | (2016.01) |
| *H01M 8/0263* | (2016.01) |
| *H01M 8/2465* | (2016.01) |

(52) U.S. Cl.
CPC ......... *H01M 8/026* (2013.01); *H01M 8/0206* (2013.01); *H01M 8/0254* (2013.01); *H01M 8/0263* (2013.01); *H01M 8/2465* (2013.01)

(58) Field of Classification Search
CPC .. H01M 8/026; H01M 8/2465; H01M 8/0206; H01M 8/0263; H01M 8/0254; Y02E 60/50
USPC .................................................. 429/457, 514
See application file for complete search history.

(56) References Cited

U.S. PATENT DOCUMENTS

| | | | |
|---|---|---|---|
| 2004/0197633 A1* | 10/2004 | Yamamoto | H01M 8/0226 429/434 |
| 2004/0265675 A1 | 12/2004 | Woodcock et al. | |
| 2009/0169964 A1* | 7/2009 | Ikeda | H01M 8/0206 429/509 |

(Continued)

FOREIGN PATENT DOCUMENTS

| | | |
|---|---|---|
| JP | 63-119166 | 5/1988 |
| JP | 2006-236851 | 9/2006 |
| JP | 2009-59685 | 3/2009 |

(Continued)

OTHER PUBLICATIONS

Abstract in English of WO 2014/082784. See US 2015/0255804 A1 for English Equivalent.*

(Continued)

*Primary Examiner* — Patrick Ryan
*Assistant Examiner* — Claire L Roe
(74) *Attorney, Agent, or Firm* — Greenblum & Bernstein, P.L.C.

(57) ABSTRACT

A separator for a fuel cell includes a thin metal plate, protrusions that are formed on the metal plate to be close to each other, and gas passages formed by the protrusions. Each gas passage has a first opening corresponding to an inlet and a second opening corresponding to an outlet. The gas passages include a first gas passage, which has a relatively low pressure loss of gas flow, and a second gas passage, which has a relatively high pressure loss of gas flow. The area of the first opening of the first gas passage is set to be smaller than the area of the first opening of the second gas passage.

6 Claims, 5 Drawing Sheets

(56) References Cited

U.S. PATENT DOCUMENTS

2009/0291350 A1* 11/2009 Ishida ................. H01M 8/0247
429/499
2015/0263358 A1* 9/2015 Zaffou .................. H01M 8/188
429/51

FOREIGN PATENT DOCUMENTS

| JP | 2009-81061 | 4/2009 | | |
|----|------------|--------|---|---|
| JP | 2009-146572 | 7/2009 | | |
| JP | 2014-86263 | 5/2014 | | |
| WO | WO 2014082784 A1 * | 6/2014 | ............ | H01M 8/241 |

OTHER PUBLICATIONS

Foreign Office Action received in JP2014-135980 and English language translation, dated Jun. 20, 2017.

* cited by examiner

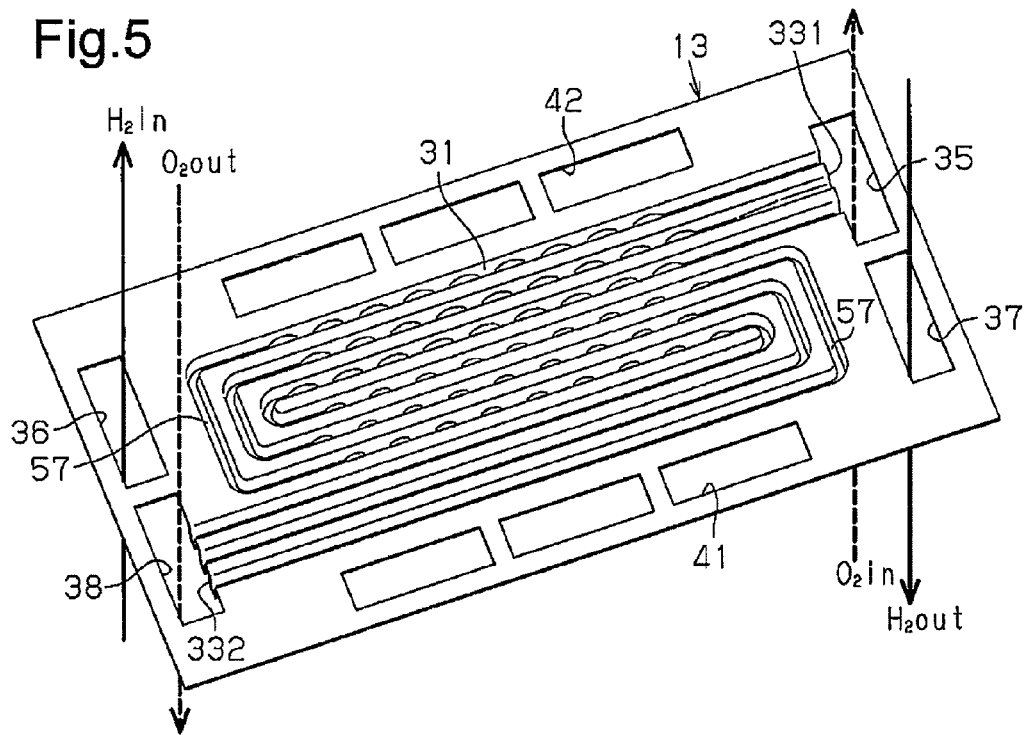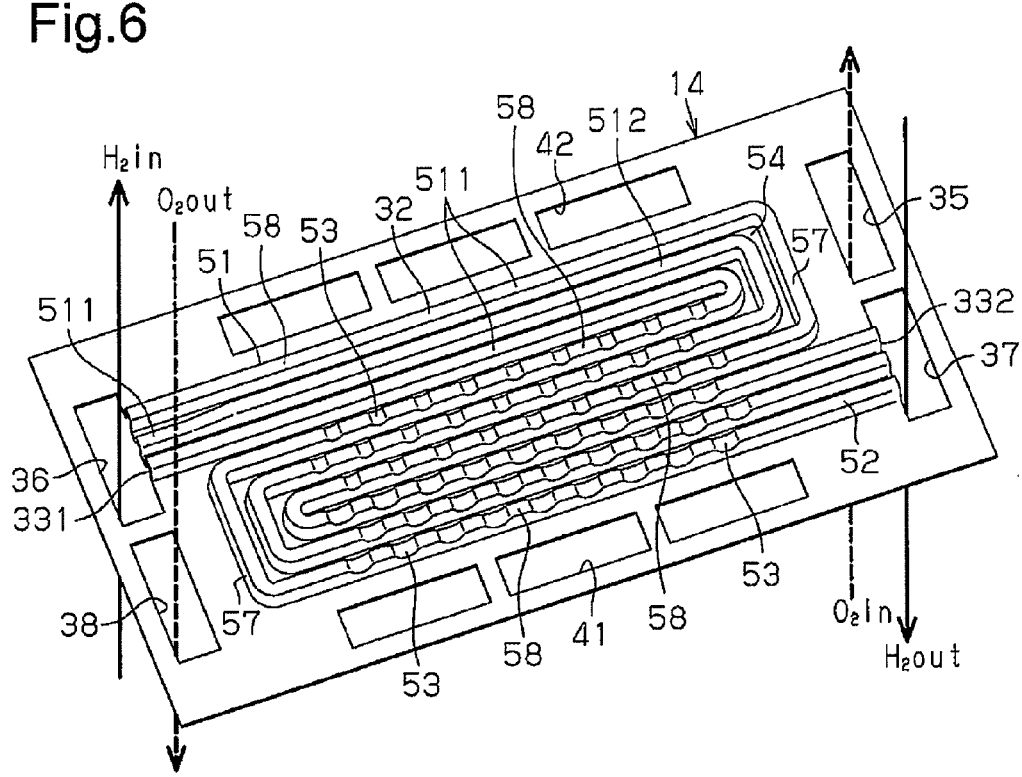

SEPARATOR FOR FUEL CELL

BACKGROUND OF THE INVENTION

The present invention relates to a separator for a fuel cell that has gas passages for fuel gas and oxidation gas.

This type of separator has gas passages. In this case, to enable efficient power generation, gas preferably evenly flows in the gas passages.

Japanese Laid-Open Patent Publication No. 2009-59685 discloses a configuration having gas passages and parts of enlarged and reduced cross-sectional flow areas on the upstream side and the downstream side of the passages. The publication describes that gas is caused to pass through these parts so that the evenness of gas distribution to the gas passages is improved.

The separator of the publication includes coupling passages located on the upstream side and the downstream side of the gas passages, and each coupling passage has a part of an enlarged cross-sectional flow area and a part of a reduced cross-sectional flow area. As a result, the gas passages are elongated, which in turn increases the size of the whole separator.

SUMMARY OF THE INVENTION

Accordingly, it is an objective of the present invention to provide a separator for a fuel cell that is capable of being reduced in size.

To achieve the foregoing objective and in accordance with one aspect of the present invention, a separator for a fuel cell is provided that includes a thin metal plate, a plurality of protrusions, and a plurality of gas passages. The plurality of protrusions is formed on the metal plate, and the protrusions are arranged to be close to each other. The gas passages are formed by the protrusions. Each gas passage has a first opening corresponding to an inlet and a second opening corresponding to an outlet. The gas passages include a first gas passage, which has a relatively low pressure loss of gas flow, and a second gas passage, which has a relatively high pressure loss of gas flow. An area of the first opening of the first gas passage is set to be smaller than an area of the first opening of the second gas passage.

With this configuration, the gas passages do not need to have enlarged parts or reduced parts for evenly distributing gas to the gas passages. This prevents the gas passages from being unnecessarily elongated and thus allows the separator to be reduced in size.

BRIEF DESCRIPTION OF THE DRAWINGS

FIG. 5 is a perspective view showing a separator;

FIG. 6 is a perspective view showing the separator of FIG. 5 in an inverted state;

DETAILED DESCRIPTION OF THE PREFERRED EMBODIMENTS

One embodiment will now be described.

Figure 1:
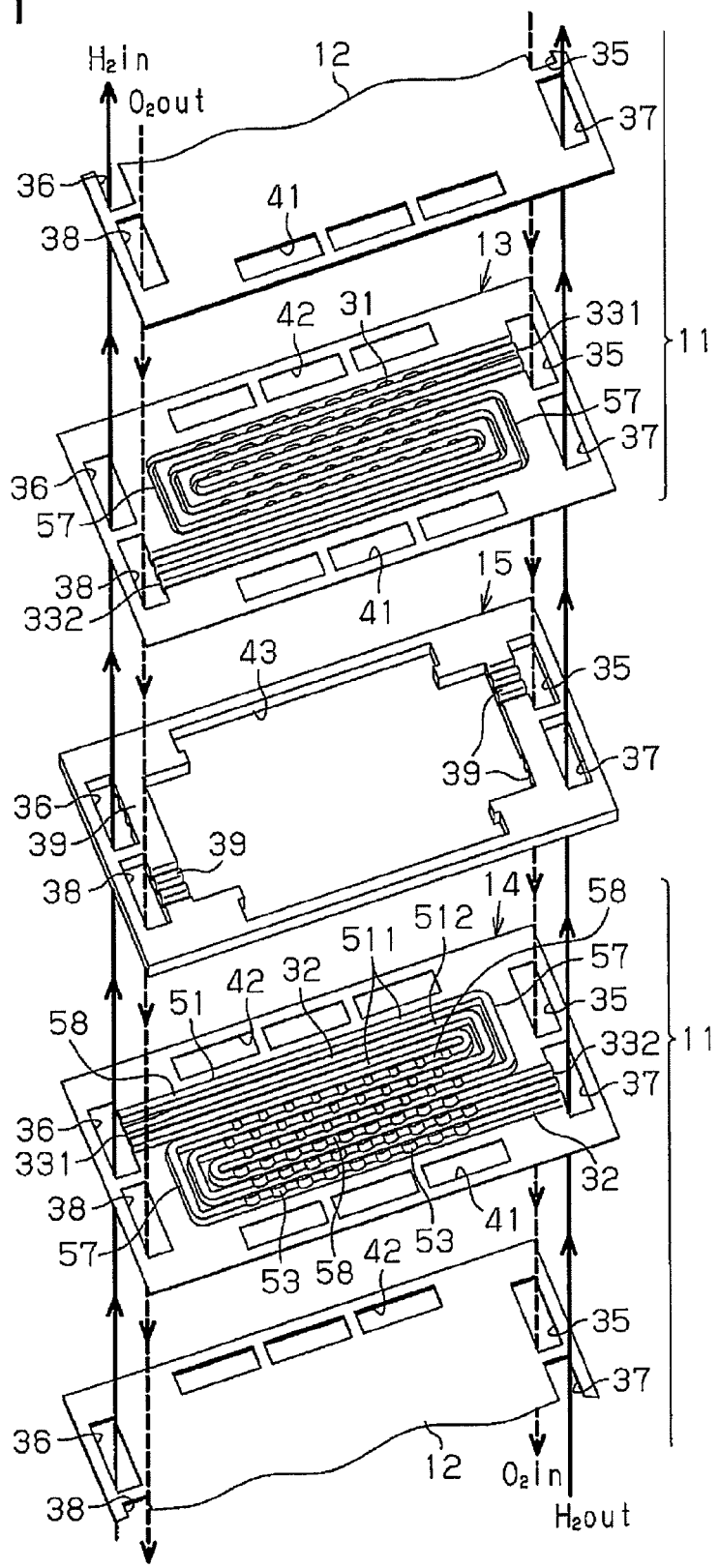
FIG. 1 is an exploded perspective view of a fuel cell.
Figure 2:
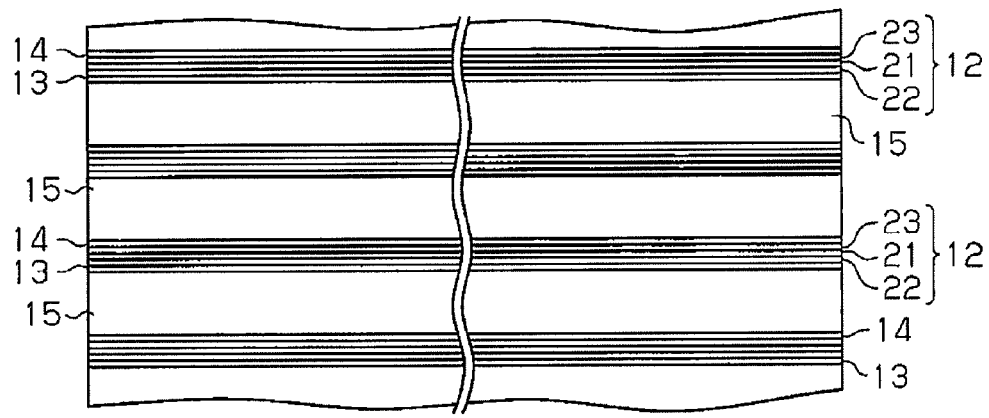
FIG. 2 is a partial side view showing the fuel cell of in FIG. 1.

As shown in FIGS. 1 and 2, a fuel cell includes a number of stacked power generating cells 11. Each power generating cell 11 is rectangular and includes an electrode member 12, a first separator 13, and a second separator 14. The first and second separators 13, 14 are laminated on the opposite sides of the electrode member 12. The separators 13, 14 are formed of thin metal plates, for example, made of a titanium alloy or a stainless steel. In the drawings, the thicknesses of the separators 13, 14 are exaggerated.

Figure 7:
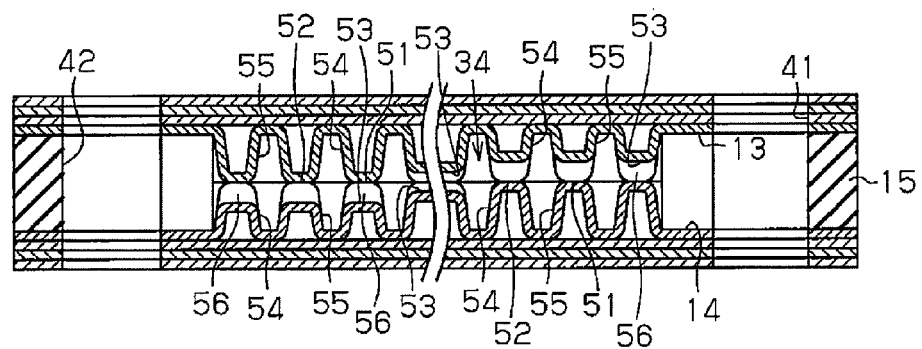
FIG. 7 is a cross-sectional view showing the fuel cell of FIG. 1, illustrating passages for coolant.

As shown in FIGS. 1 and 7, the separators 13, 14 each have a front face and a back face. The separators 13, 14 of adjacent power generating cells 11 are brought into contact with the back faces facing each other. An elastic sealing frame 15 made of an electric insulating material is arranged between the peripheral portions of each adjacent pair of the power generating cells 11. The sealing frames 15 are designed to seal between the peripheral portions of adjacent power generating cells 11, that is, to maintain the sealing property.

Figure 4:
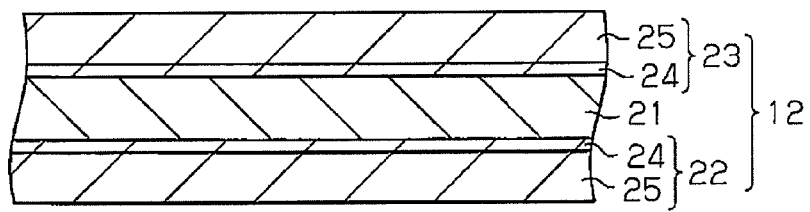
FIG. 4 is an enlarged cross-sectional view showing a part of a power generating electrode member.

As shown in FIG. 4, each electrode member 12 includes a solid electrolyte membrane 21, a cathode-side electrode layer 22, and an anode-side electrode layer 23. The electrode layers 22, 23 are laminated on the opposite sides of the solid electrolyte membrane 21. The electrode layers 22, 23 each have a catalyst layer 24 and a diffusion layer 25. The diffusion layers 25 of the electrode layers 22, 23 are located on the sides on which the separators 13, 14 are laminated.

Figure 3:
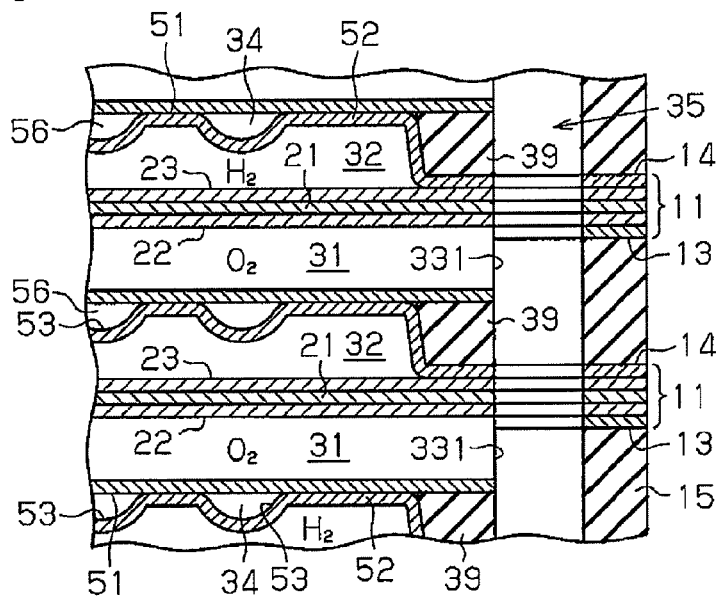
FIG. 3 is a partial cross-sectional view showing the fuel cell of in FIG. 1.

As shown in FIGS. 1 and 3, each separator 13 has meandering oxidation gas passages 31 on the side on which the cathode-side electrode layer 22 is arranged. The oxidation gas passages 31 allow oxidation gas, which is oxygen or air, to flow therethrough. Each second separator 14 has meandering fuel gas passages 32 on the side on which the anode-side electrode layer 23 is arranged. The fuel gas passages 32 allow fuel gas, which is hydrogen, to flow therethrough. As shown in FIGS. 5 and 6, first openings 331 and second openings 332 are formed at the opposite ends of the gas passages 31, 32. The first openings 331 correspond to the inlet of fuel gas or oxidation gas, and the second openings 332 correspond to the outlet.

As shown in FIG. 7, coolant passages 34 are formed between adjacent separators 13, 14 to allow coolant to flow therethrough.

As shown in FIG. 1, an oxidation gas supply channel 35, a fuel gas supply channel 36, a fuel gas discharge channel 37, and an oxidation gas discharge channel 38 are formed to extend through the separators 13, 14, the sealing frames 15, and the electrode members 12. That is, each power generating cell 11 has an oxidation gas supply channel 35, a fuel gas supply channel 36, a fuel gas discharge channel 37, and an oxidation gas discharge channel 38 extending therethrough. The oxidation gas passages 31 of the first separator 13 are located between the oxidation gas supply channel 35 and the oxidation gas discharge channel 38, and the fuel gas passages 32 of the second separator 14 are located between the fuel gas supply channel 36 and the fuel gas discharge channel 37. Therefore, the openings 331, 332 of the gas passages 31, 32 each communicate with the channels 35, 36, 37, 38. As shown in FIGS. 1 and 3, each sealing frame 15 has support portions 39, which are located in the vicinity of the channels 35, 36, 37, and 38. The support portions 39 support protrusions 51, which are discussed below, by fitting protrusions and recesses together.

Oxidation gas is supplied from the oxidation gas supply channel 35 to the oxidation gas passages 31 via the first openings 331 of the oxidation gas passages 31. The oxidation gas flows over the diffusion layer 25 of the cathode-side electrode layer 22 of the electrode member 12 to be diffused into the diffusion layer 25, so that the oxidation gas is supplied to the catalyst layer 24 of the cathode-side electrode layer 22. In contrast, fuel gas is supplied from the fuel gas supply channel 36 to the fuel gas passages 32 via the first openings 331 of the fuel gas passages 32. The fuel gas flows over the diffusion layer 25 of the anode-side electrode layer 23 of the electrode member 12 and to be diffused into the diffusion layer 25, so that the fuel gas is supplied to the catalyst layer 24 of the anode-side electrode layer 23. An electrode reaction between the fuel gas and the oxidation gas is caused in the electrode member 12 and power is generated.

Fuel off-gas, which has not been used for generating power, is discharged to the fuel gas discharge channel 37 from the second openings 332 of the fuel gas passages 32. Oxidation off-gas, which has not been used for generating power, is discharged to the oxidation gas discharge channel 38 from the second openings 332 of the oxidation gas passages 31.

As shown in FIGS. 1, 3, and 7, a coolant supply channel 41 and a coolant discharge channel 42 are formed to extend through the electrode members 12 and the separators 13, 14. Each sealing frame 15 has a communication opening 43 at a part corresponding to the channels 41, 42 and the coolant passages 34. When heated through power generation, each electrode member 12 is cooled by coolant that flows through the coolant passages 34 between the separators 13, 14 via the coolant supply channel 41 and the communication opening 43 of the sealing frame 15. The coolant that has been used for cooling is discharged to an external passage via the communication opening 43 of the sealing frame 15 and the coolant discharge channel 42.

As shown in FIGS. 5 to 8, the separators 13, 14 have an identical structure. The separators 13, 14 have, on the back faces, protrusions 51, which are arranged to be close to one another. The gas passages 31, 32 are formed by grooves that are formed on the side opposite to the protrusions 51, or on the front faces of the separators 13, 14. The protrusions 51 are formed by pressing. Adjacent separators 13, 14 are arranged such that top walls 52 of the protrusions 51 contact each other with the back faces face each other as mentioned above. In the present embodiment, three protrusions 51 are formed. Each protrusion 51 includes three extended portions 58, which extend along the long sides of the separators 13, 14, and two bent portions 57 each located between adjacent extended portions 58. The three protrusions 51 extend parallel with each other in the extended portions 58. Each protrusion 51 is inverted in the extending direction at the bent portions 57 to have a meandering shape. Among the three protrusions 51, the center one will be referred to as a first protrusion 512, and the two on the sides of the first protrusion 512 will be referred to as second protrusions 511. In this case, each second protrusion 511 is inverted by being bent by 180 degrees at one of the two bent portions 57 and is inverted by being bent by 90 degrees twice at the other bending portion 57. The center first protrusion 512 is inverted by being bent by 90 degrees twice at either bent portion 57. Therefore, the second protrusions 511, which are located on the sides of the first protrusion 512, are bent by greater degrees than the first protrusion 512.

The protrusions 51 each have recesses 53, which are formed by denting the top wall 52 of the protrusions 51. As shown in FIGS. 3 and 7, adjacent separators 13, 14 are arranged to form a first spaces 55 with the grooves 54 between the protrusions 51. Also, second spaces 56 are formed between the recesses 53 formed in the top walls 52 of the protrusions 51 of adjacent separators 13, 14 and between the recesses 53 and the top walls 52 of the protrusions 51. The first spaces 55 and the second spaces 56 of adjacent separators 13, 14 form the coolant passages 34.

As shown in FIGS. 1, 5, and 6, the first openings 331 of the gas passages 31, 32 are formed on one of the sides that define the oxidation gas supply channel 35 and the fuel gas supply channel 36 and face the supply channels 35, 36, respectively. The second openings 332 of the gas passages 31, 32 are formed on one of the sides that define the fuel gas discharge channel 37 and the oxidation gas discharge channel 38 and face the discharge channels 37, 38, respectively.

Figure 8:
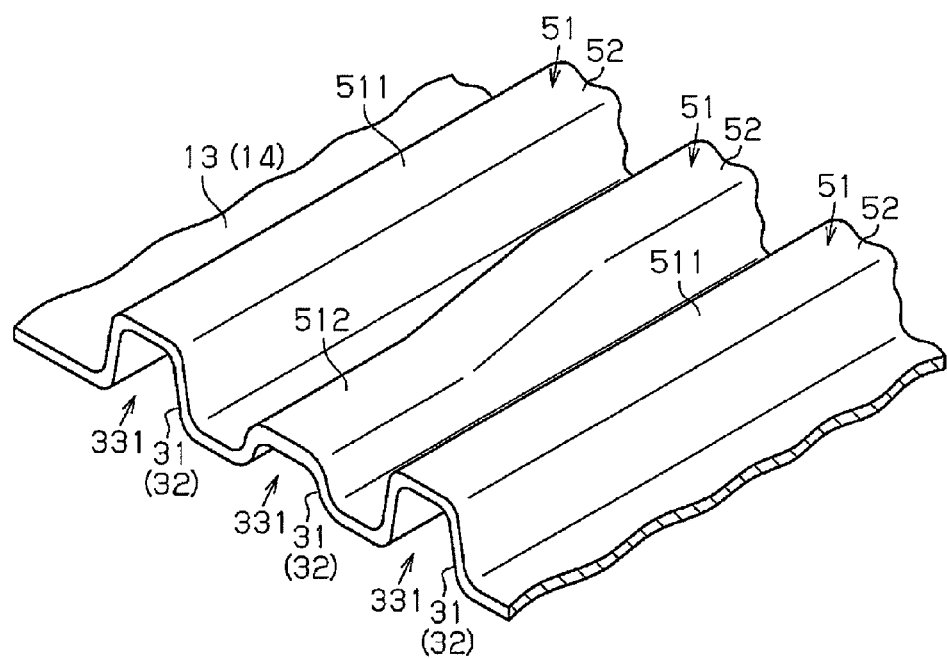
FIG. 8 is a perspective view showing a part of the separator that includes first openings.
Figure 9:
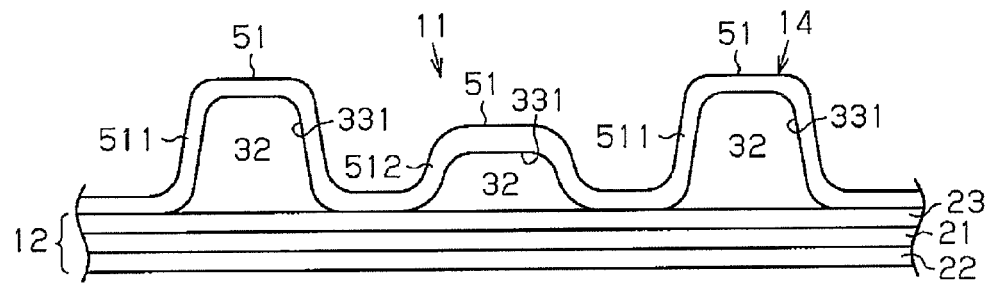
FIG. 9 is a side view showing a part of the separator that includes first openings.

As shown in FIGS. 8 and 9, among the three protrusions 51, the first protrusion 512, which is located at the center, has a part inclined downward at a position close to the first opening 331, so that the top wall 52 of the first protrusion 512 is lowered toward the first opening 331. Thus, the height of the first protrusion 512 at one end is lower than the second protrusions 511, which are on the sides of the first protrusion 512. Accordingly, the area of the first opening 331 of the first protrusion 512 is smaller than the area of the first opening 331 of each second protrusion 511.

Functions of the separators 13, 14 of the present embodiment will mainly be described below.

To generate power, oxidation gas is caused to flow to the oxidation gas passages 31 from the oxidation gas supply channel 35 and via the first openings 331 of the oxidation gas passages 31. Also, fuel gas is caused to flow to the fuel gas passages 32 from the fuel gas supply channel 36 and via the first openings 331 of the fuel gas passages 32. This initiates power generating reaction. Then, the oxidation gas flows from the second openings 332 of the oxidation gas passages 31 to the oxidation gas discharge channel 38, and the fuel gas flows from the second openings 332 of the fuel gas passages 32 to the fuel gas discharge channel 37. As clearly illustrated in FIGS. 5 and 6, the degree of bending of the second protrusions 511, which are located on the sides of the first protrusion 512 of the separators 13, 14, is greater than that of the first protrusion 512. Therefore, when the passages 31, 32 formed on the back faces of the first protrusions 512 are referred to as first gas passages, and the passages 31, 32 formed on the back face of the second protrusions 511 are referred to as second gas passages, the pressure loss of the gas flow in the second gas passages is higher than that in the first gas passage. Therefore, gas is less likely to flow through the passages 31, 32 formed on the back face of the second protrusions 511 (the second gas passages). As a result, these passages 31, 32 resist entry of gas.

In the present embodiment, since the area of the first opening 331 of the first gas passage at the center is smaller than the area of each of the second passages on the sides, the flow rate of oxidation gas and fuel gas that flows into the first gas passage through the first opening 331 is reduced. This equalizes the flow rates of oxidation gas and fuel gas that flow through the passages 31, 32. Power generation of the fuel cell is thus equalized over the whole power generating cell 11, enabling a highly efficient power generation.

Accordingly, the present embodiment achieves the following advantages.

(1) Since the area of the first opening 331 that corresponds to the inlet of the center gas passages 31, 32 (the first gas passages), which have a lower pressure loss among the gas passages 31, 32, is set to be smaller than the area of the first opening 331 that corresponds to the inlet of the gas passages 31, 32 (the second gas passages) that have a higher pressure loss, the flow rates of gas flowing in the gas passages 31, 32 are equalized. This allows the power generating cell 11 to efficiently generate power.

(2) Since the flow rates of gas are equalized by varying the heights, or the shapes, of the gas passages 31, 32, the number of components is not increased and the structure is simple.

(3) The gas flow rates in the gas passages 31, 32 are equalized by varying the areas of the first openings 331. Thus, unlike the configuration of Japanese Laid-Open Patent Publication No. 2009-59685, no additional structures such as passages are required in the gas passages 31, 32 to equalize the gas flow rates. This prevents the gas passages 31, 32 from being excessively elongated and forms the power generating region substantially over the entire power generating cell 11. The fuel cell therefore can be reduced in size, and the power generating area of the power generating cells 11 is enlarged to improve the power generation efficiency.

The above embodiment may be modified as follows.

Two or more than three gas passages 31, 32 may be provided. In these cases also, the area of the opening of a passages 31, 32 that has a lower pressure loss is set to be smaller than the area of the opening a passage that has a higher pressure loss.

The opening area can be reduced by reducing the width of the first opening 331.

The opening area can be reduced by changing the shape of the first opening 331. For example, a first opening 331 having a larger opening area may be formed by forming an opening with a semicircular or rectangular shape, and a first opening 331 having a smaller opening area may be formed by forming an opening with a triangular shape.

Figure 10:
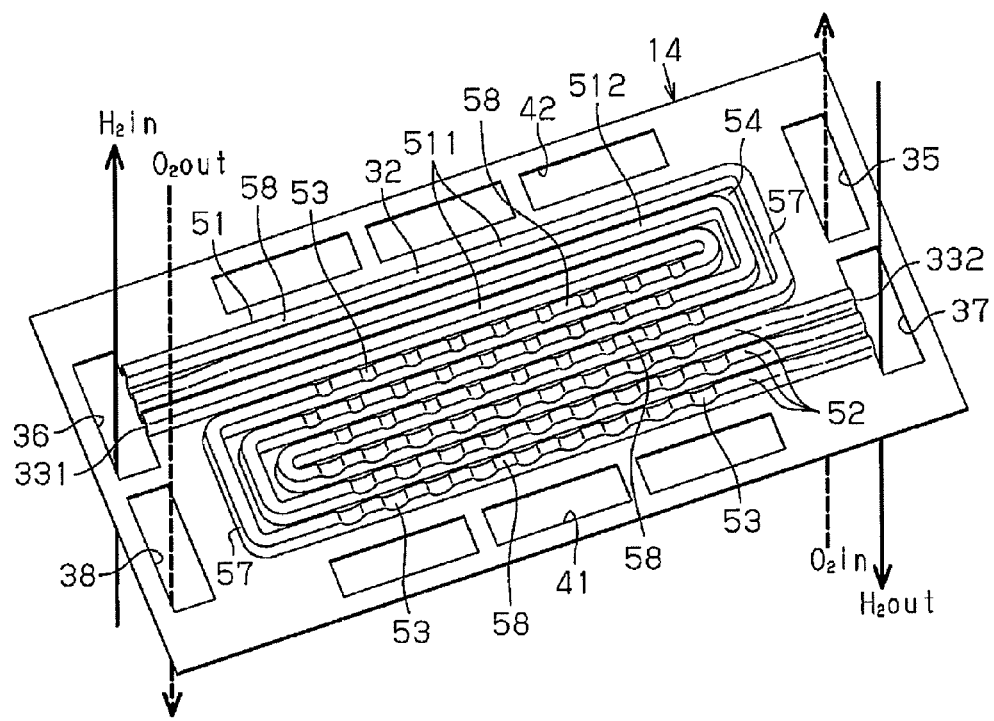
FIG. 10 is a perspective view showing a separator according to a modification.

As shown in FIG. 10, the top walls 52 at ends of the protrusions 51 close to the second openings 332 may be inclined so that the areas of the second openings 332 corresponding to the outlet of the passages 31, 32 are smaller than the cross-sectional flow areas on the upstream side. In this configuration, when water generated in the passages 31, 32 during power generation moves to and blocks the second openings 332, the blocked second openings 332 increases the pressure in the passages 31, 32. By utilizing the increased pressure, the generated water in the second openings 332 is discharged in a spraying manner. Thus, even if the ambient temperature falls to or below the freezing temperature during stoppage of the fuel cell, ice accretion in the fuel cell is reduced.

The invention claimed is:

1. A separator for a fuel cell, comprising:
a thin metal plate;
a plurality of protrusions formed on the metal plate, wherein the protrusions are arranged adjacent to each other; and
a plurality of gas passages formed by the protrusions, wherein
each gas passage has a first opening corresponding to an inlet and a second opening corresponding to an outlet,
the gas passages include a first gas passage, which has a relatively low pressure loss of gas flow, and a second gas passage, which has a relatively high pressure loss of gas flow,
one of the protrusions, which forms the first gas passage, includes a top wall that is inclined to be lowered toward the first opening of the first gas passage, and
an area of the first opening of the first gas passage is set to be smaller than an area of the first opening of the second gas passage by the inclined top wall.

2. The separator for a fuel cell according to claim 1, wherein the gas passages extend parallel with each other.

3. The separator for a fuel cell according to claim 2, wherein each gas passage includes a plurality of bent portions, which cause the gas passage to meander.

4. The separator for a fuel cell according to claim 3, wherein
the first gas passage is caused to meander to have a relatively small degree of bending, and
the second gas passage is caused to meander to have a relatively great degree of bending.

5. The separator for a fuel cell according to claim 1, wherein an area of the second opening of each gas passage is set to be smaller than a cross-sectional flow area of an upstream side of the gas passage.

6. A fuel cell formed by stacking a plurality of power generating cells, wherein
each power generating cell includes:
a pair of separators for a fuel cell; and
an electrode member held by the separators,
each separator includes:
a thin metal plate;
a plurality of protrusions formed on the metal plate, wherein the protrusions are arranged adjacent to each other; and
a plurality of gas passages formed by the protrusions, wherein
each gas passage has a first opening corresponding to an inlet and a second opening corresponding to an outlet,
the gas passages include a first gas passage, which has a relatively low pressure loss of gas flow, and a second gas passage, which has a relatively high pressure loss of gas flow,
one of the protrusions, which forms the first gas passage, includes a top wall that is inclined to be lowered toward the first opening of the first gas passage,
an area of the first opening of the first gas passage is set to be smaller than an area of the first opening of the second gas passage by the inclined top wall,
each power generating cell includes a gas supply channel and a gas discharge channel,
each gas passage is located between the gas supply channel and the gas discharge channel, and
the first opening of each gas passage is arranged to face the gas supply channel.

* * * * *